United States Patent [19]

Slawson, Sr. et al.

[11] Patent Number: 4,965,990
[45] Date of Patent: Oct. 30, 1990

[54] LAWN MOWER AND EDGER ASSEMBLY

[76] Inventors: Earnest E. Slawson, Sr.; Ara M. Slawson, both of P.O. Box 54025, Pearl, Miss. 39288

[21] Appl. No.: 406,027

[22] Filed: Sep. 11, 1989

[51] Int. Cl.$^5$ .................................. A01D 34/84
[52] U.S. Cl. .................................. 56/13.7; 56/16.9; 56/256
[58] Field of Search .............. 56/11.6, 13.7, 16.9, 56/256; 172/13, 14

[56] References Cited

U.S. PATENT DOCUMENTS

| | | | |
|---|---|---|---|
| 3,019,585 | 2/1962 | Wellborn | 56/256 X |
| 3,192,693 | 7/1965 | Bergeson | 56/256 X |
| 3,304,700 | 2/1967 | Barber | 56/13.7 X |
| 3,421,300 | 1/1969 | Rhodes | 172/14 X |
| 3,803,818 | 4/1974 | Chaney | 56/13.7 X |
| 4,453,372 | 6/1984 | Remer | 56/13.7 |
| 4,478,028 | 10/1984 | Dawson, Jr. | 56/16.9 |
| 4,528,805 | 7/1985 | Zitta | 56/11.6 |
| 4,551,967 | 11/1985 | Murcho | 56/13.7 |
| 4,715,169 | 12/1987 | Ould | 56/16.9 |
| 4,718,221 | 1/1988 | Wessel et al. | 56/16.9 |

*Primary Examiner*—Ramon S. Britts
*Assistant Examiner*—David J. Bagnell
*Attorney, Agent, or Firm*—Leon Gilden

[57] ABSTRACT

A lawn mower and edger assembly includes a first pulley mounted to the drive shaft of the associated lawn mower to operate a series of forwardly mounted pulleys to rotatably drive an edger blade mounted laterally and forwardly relative to an associated lawn mower deck mounting the lawn mower engine. An over-center lever assembly is provided for forwardly pivoting and engaging the edging blade relative to the lawn mower drive pulley.

5 Claims, 4 Drawing Sheets

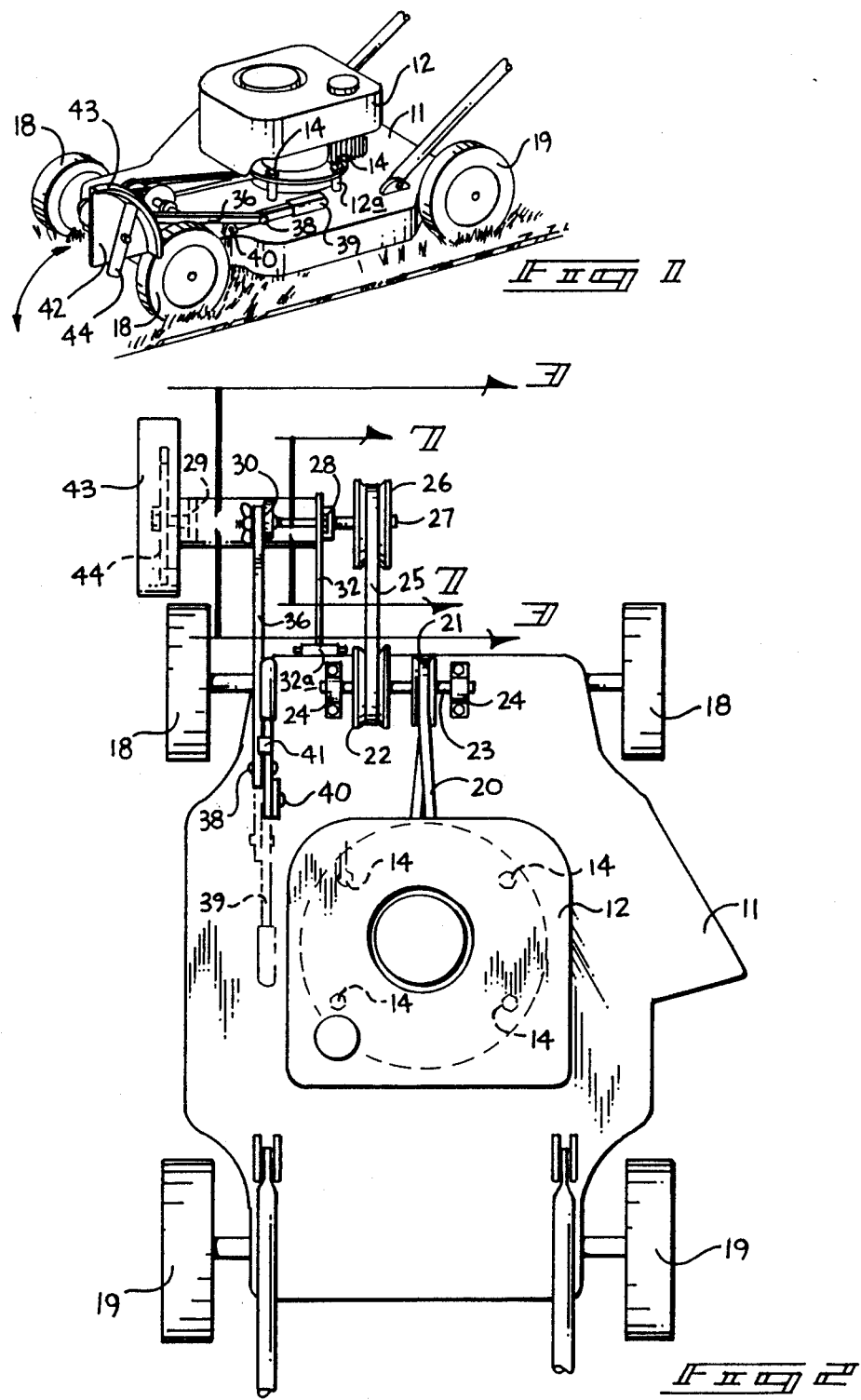

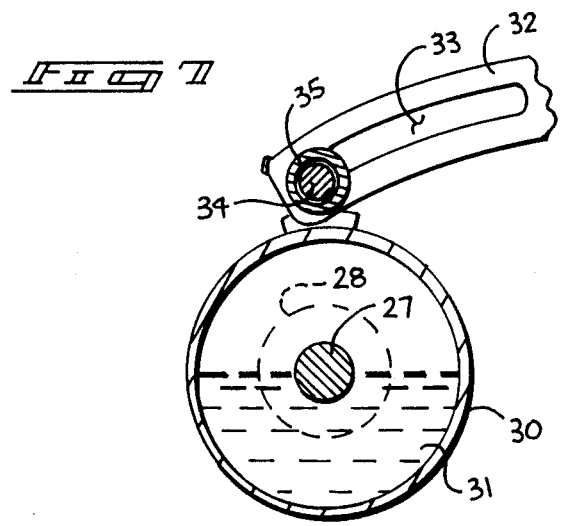
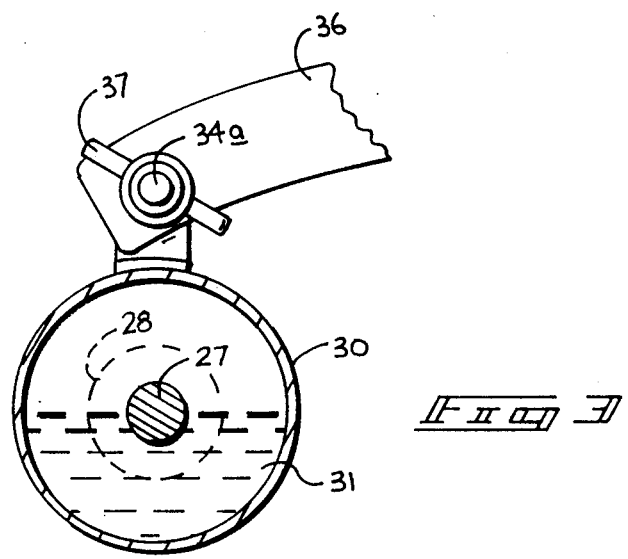

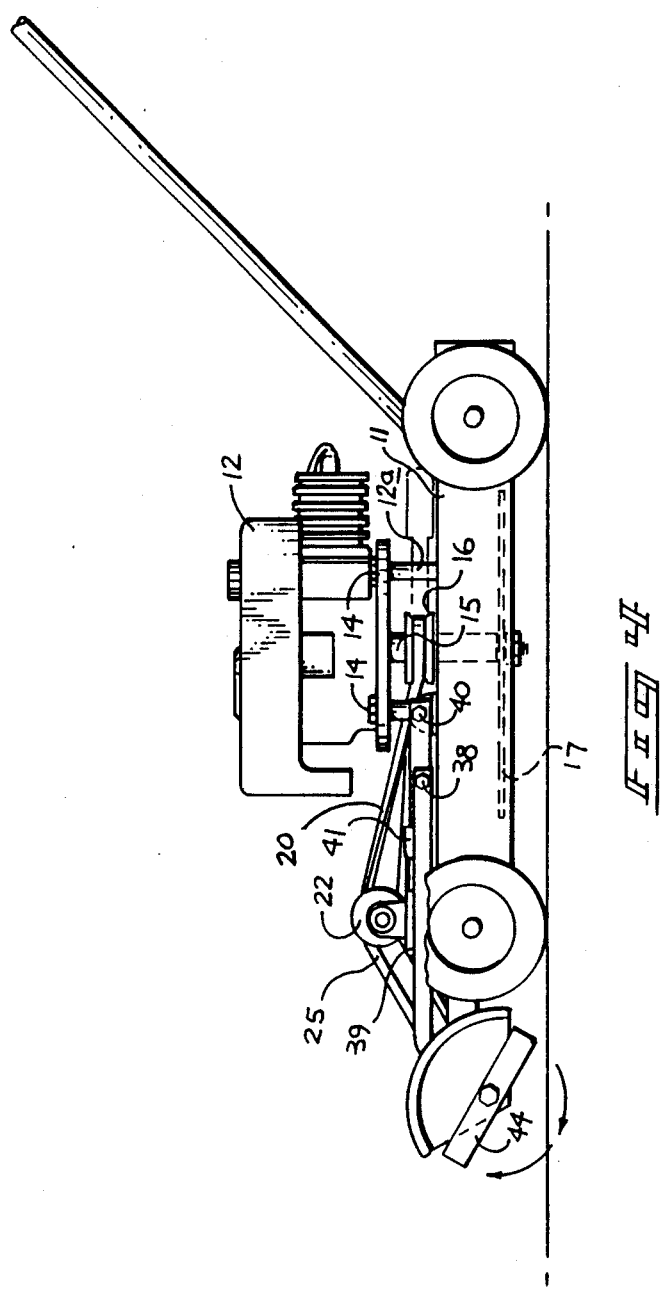

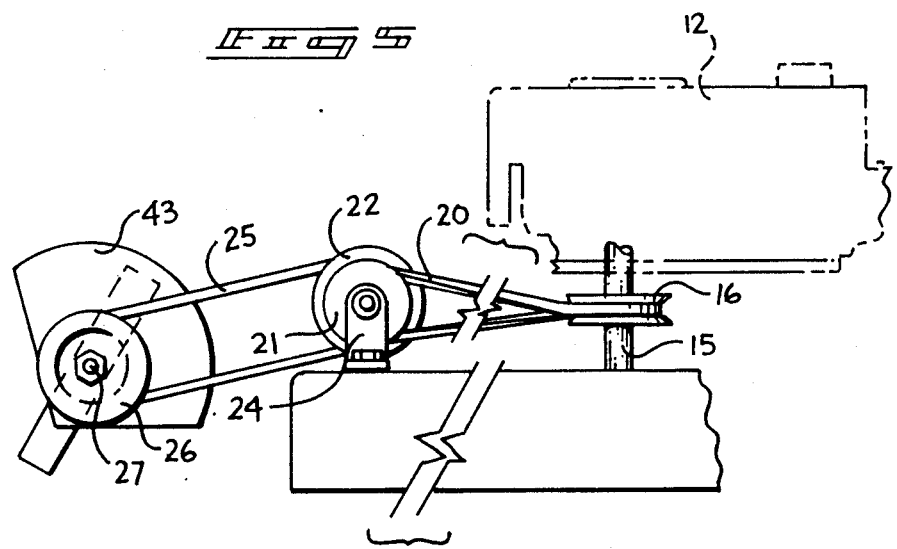
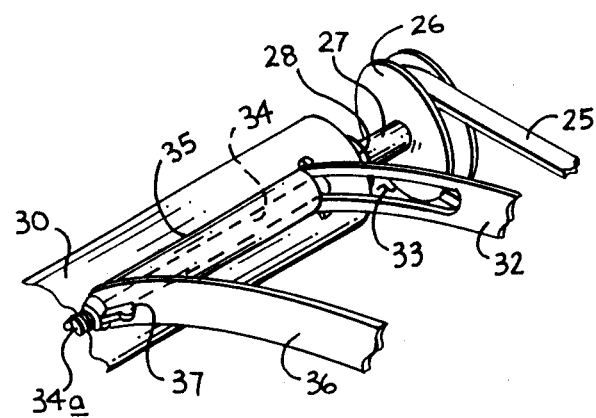

LAWN MOWER AND EDGER ASSEMBLY

BACKGROUND OF THE INVENTION

1. Field of the Invention

The field of invention relates to edger assemblies, and more particularly pertains to a new and improved lawn mower and edger assembly wherein the same includes an edger selectively operative to effect a lawn edging operation.

2. Description of the Prior Art

The use of edger assemblies in combination with lawn mowers have been utilized in the prior art. Heretofore, the edger assemblies have been of a relatively complex organization, as opposed to that set forth by the instant invention to effect an edging operation in conjunction with rotative power supplied by the lawn mower engine. Examples of the prior art include U.S. Pat. No. 4,715,169 to Ould setting forth an edging attachment bolted to a lawn mower utilizing an elongate drive shaft associated with a pulley arrangement coupled to the associated lawn mower engine.

U.S. Pat. No. 4,718,221 to Wessel, et al. provides a freely rotatable disk positionable relative to a lawn mower and pivotal from an operative to an inoperative position relative to the lawn mower without use of direct drive relative to the lawn mower engine.

U.S. Pat. No. 4,551,967 to Murcko sets forth a rotary lawn mower utilizing a flexible cable and lever to effect a raising or lowering of an edger blade relative to the associated lawn mower.

U.S. Pat. No. 4,453,372 to Remer sets forth a grass edger utilizing a rotary flexible drive shaft secured within a multi-positionable boom secured to the lawn mower to enable positioning of the edger as desired relative to the lawn mower.

U.S. Pat. No. 4,528,805 to Zitta provides a lawn mower attachment pivotally mounted relative to a side portion of the lawn mower including a shaft with a power take-off controlled by a hand lever on the lawn mower handle to engage and disengage the edge relative to the lawn mower engine.

As such, it may be appreciated that there is a continuing need for a new and improved lawn mower and edge assembly wherein the same addresses both the problems of ease of use and effectiveness in organization and in this respect, the present invention substantially fulfills this need.

SUMMARY OF THE INVENTION

In view of the foregoing disadvantages inherent in the known types of lawn mower and edger assemblies now present in the prior art, the present invention provides a lawn mower and edger assembly wherein the same includes an assembly permanently mounted to a forward portion of the lawn mower including a pivotal lever assembly to engage and disengage the edger portion relative to the lawn mower. As such, the general purpose of the present invention, which will be described subsequently in greater detail, is to provide a new and improved lawn mower and edger assembly which has all the advantages of the prior art lawn mower and edger assemblies and none of the disadvantages.

To attain this, the present invention includes a first pulley mounted to the shaft of the lawn mower engine including a second and third pulley directing power from the lawn mower engine to a forwardly mounted edge blade shaft to effect rotation of the shaft including a pivoted lever assembly to engage and disengage the drive belt relative to the edger shaft assembly and additionally position the edger assembly in an operative position relative to a lawn to be cut.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved lawn mower and edger assembly which has all the advantages of the prior art lawn mower and edger assembly and none of the disadvantages.

It is another object of the present invention to provide a new and improved lawn mower and edger assembly which may be easily and efficiently manufactured and marketed.

It is a further object of the present invention to provide a new and improved lawn mower and edger assembly which is of a durable and reliable construction.

An even further object of the present invention is to provide a new and improved lawn mower and edger assembly which is susceptible of a low cost of manufacture with regard to both materials and labor, and which accordingly is then susceptible of low prices of sale to the consuming public, thereby making such lawn mower and edger assembly economically available to the buying public.

Still yet another object of the present invention is to provide a new and improved lawn mower and edger assembly which provides in the apparatuses and methods of the prior art some of the advantages thereof, while simultaneously overcoming some of the disadvantages normally associated therewith.

Still another object of the present invention is to provide a new and improved lawn mower and edger assembly wherein the same is fixedly mounted relative to a forward portion of a lawn mower deck and pivotally positionable from a first inoperative to a second operative position relative to the lawn mower deck and associated lawn.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention in association with a lawn mower.

FIG. 2 is a top orthographic view of the instant invention.

FIG. 3 is an orthographic view taken along the lines 3—3 of FIG. 2 in the direction indicated by the arrows.

FIG. 4 is an orthographic side view taken in elevation of the instant invention.

FIG. 5 is an orthographic view taken in elevation of the pulley and belt association assemblies.

FIG. 6 is an isometric illustration of the edger housing and its association with the securement brackets utilized by the instant invention.

FIG. 7 is an orthographic view taken along the lines 7—7 of FIG. 2 in the direction indicated by the arrows.

DESCRIPTION OF THE PREFERRED EMBODIMENT

With reference now to the drawings, and in particular to FIGS. 1 to 7 thereof, a new and improved lawn mower and edger assembly embodying the principles and concepts of the present invention and generally designated by the reference numeral 10 will be described.

More specifically, the lawn mower and edger assembly 10 essentially comprises a lawn mower that includes a conventional lawn mower deck 11 formed with an upper, generally planar surface with an engine 12 mounted thereon spaced above the deck 11 to provide use for a coupling shaft or alternatively provide additional clearance for the drive belts, as discussed in more detail below. To effect a raising of the lawn mower, spacer sleeves 12a are mounted to an upper surface of the lawn mower deck and the lawn mower engine utilizing engine securement bolts 14. A vertical engine drive shaft 15 extends orthogonally downwardly relative to the upper surface of the deck 11 including a first pulley 16 fixedly mounted onto the drive shaft 15 positioned between the engine and a grass cutting blade 17. The lawn mower is provided with a pair of forwardly mounted wheels 18 axially aligned relative to one another and a plurality of rear wheels 19, also axially aligned relative to one another, spaced and mounted through a rear portion of the deck 11 about a downwardly depending skirt of the deck. A rear drive belt 20 associates the first pulley 16 and a second pulley 21 mounted and spaced from a third pulley 22 on a rotatable pulley shaft 23 that is rotatably mounted within spaced bearing boxes 24 there in turn fixedly mounted to an upper surface of the lawn mower deck 11. The third pulley 22 has operably secured thereto a forward drive belt 25 operatively associated with a fourth pulley 26. The fourth pulley 26 is secured to an elongate blade shaft 27 with a rear shaft bearing 28 mounted adjacent the fourth pulley 26 with a forward shaft bearing 29 mounted adjacent a forward end of an elongate cylindrical housing 30. The cylindrical housing 30 includes an oil bath 31 to provide constant lubrication to the rear and forward bearings 28 and 29. An elongate right control bracket 32 is pivotally mounted within a right control bracket pivot 32a that is mounted to a forward portion of the skirt of the lawn mower deck and includes an elongate slot 33 and there receives a bolt member 34 therethrough, wherein the bolt member 34 is slidably mounted within the slot. The bolt member 34 includes an elongate threaded shank 34a extending from the slot 33 through a left control bracket aperture formed within a left control bracket 36. A sleeve 35 is of a length substantially equal to the distance defined between the right and left control brackets and of a diameter greater than the width of the slot 33. A wing nut 37 is threadedly mounted to a terminal end of the threaded shank 34a to capture the left control bracket 36 between the wing nut 37 and the sleeve 35. The bolt member 34 includes an enlarged head portion that extends through the slot 33 and thereby secures the housing in a predetermined position as desired by a user of the device. The left control bracket 36 includes a left bracket pivot 38 mounted medially of an actuator arm 39. The actuator arm 39 is pivotally mounted onto an upper surface of the deck 11 wherein the actuator arm 39 is positionable from a first rear position to a second forward position to effect repositioning of the edger assembly of the apparatus. The forward pivot 40 of the actuator arm 39 is orthogonally aligned relative to the actuator arm 39 wherein a clip flange 41 mounted fixedly onto an upper edge of a left control bracket 36 secures the actuator arm 39 in a forward operative position, as illustrated in FIG. 2 for example.

The edger cutting assembly includes a pie-shaped housing 42 defined by a plate member orthogonally and fixedly mounted to the cylinder housing 30 with a shield flange 43 overlying an upper edge of the plate defining a 90 degree radius of arc to house an edger blade 44. The edger blade 44 is fixedly mounted to a forward end of the blade shaft 27 that extends through the housing 30.

It may be understood that in use the actuator handle 39 is pivoted forwardly and secured underlying the clip flange 41 and simultaneously positions the housing 42 in an operative lowered position while simultaneously engaging the fourth pulley 26 with the third pulley 22 by use of the forward drive belt 25.

The rear drive belt 20 in operative engagement with the second pulley 21 is directed from the first pulley 16 and is freely rotatably within an elongate deck slot to accommodate the rear drive belt 20 in its merging from a position underlying the lawn mower engine 12 underlying the deck to a position overlying the deck to be received within the second pulley 21.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lawn mower and edger assembly comprising in combination,
   an edger assembly mounted to a lawn mower, the lawn mower includes a deck member with a lawn mower engine mounted to a top surface of said deck member, and said engine including a vertical shaft orthogonally directed through said deck member to a position underlying said top surface with a grass cutting blade mounted to a lower terminal end of said shaft, and
   a first pulley mounted to said vertical shaft between said blade and said engine, and
   second pulley means mounted onto the top surface of said deck member for operative association with said first pulley, and
   third pulley means operatively associated with said second pulley means for directing rotative power to said power assembly, and
   wherein said second pulley means includes a second pulley and a third pulley fixedly mounted on a pulley shaft, said pulley shaft rotatably mounted to first and second pulley shaft bearings, said first and second pulley shaft bearings fixedly mounted onto the top surface of the deck member forwardly of the engine, and
   wherein the third pulley means includes a fourth pulley fixedly mounted to a blade shaft, said blade shaft rotatably mounted through an elongate cylindrical housing, and spaced bearings mounted within said housing to rotatably support said blade shaft, and said housing including an oil reservoir therewithin, said oil reservoir in operative association with said blade shaft to effect lubrication to the spaced bearings, and an edger assembly housing mounted to a terminal end of the cylindrical housing remote from the fourth pulley, and
   wherein a right bracket is pivotally mounted to the deck at one end and pivotally mounted to the housing at its other end, and a left bracket pivotally mounted to an actuator arm at one end and to the housing at its other end, the right bracket including an elongate slot slidably receiving a bolt therethrough, the bolt including a threaded shank aligned with an aperture formed through the left bracket, and a sleeve defined by a diameter greater than a width defined by the slot positioned between the left and right brackets, and a wing nut member threadedly mounted to a terminal end of the threaded shank to secure the right and left brackets together.

2. A lawn mower and edger assembly as set forth in claim 1 wherein the left bracket is pivotally mounted at its lower end medially of the actuator arm, the actuator arm pivotally mounted at its forward end to the lawn mower deck, wherein forward rotation of the actuator arm effects engagement of the fourth pulley with the third pulley.

3. A lawn mower and edger assembly as set forth in claim 2 wherein a flange member is fixedly mounted to an upper edge of the left bracket to overlie the actuator arm when the actuator arm is in a forward position.

4. A lawn mower and edger assembly as set forth in claim 3 wherein the lawn mower engine is fixedly mounted in a spaced relationship relative to the top surface of the deck, and includes spacer sleeves mounted between the lawn mower engine and the deck to fixedly position in a spaced relationship the lawn mower engine relative to the top surface of the deck.

5. A lawn mower and edger assembly as set forth in claim 4 further including an elongate deck slot formed through the top surface of the deck member to permit the rear drive belt to engage the second pulley in operative association with the first pulley.

* * * * *